United States Patent [19]
Mizuike et al.

[11] Patent Number: 6,141,532
[45] Date of Patent: Oct. 31, 2000

[54] TRANSMISSION LINE SWITCH-OVER CONTROL SYSTEM

[75] Inventors: Takeshi Mizuike, Tokyo; Satoshi Konishi; Yoji Kishi, both of Saitama, all of Japan

[73] Assignee: KDD Corporation, Tokyo, Japan

[21] Appl. No.: 09/204,637

[22] Filed: Dec. 2, 1998

[30] Foreign Application Priority Data

Mar. 12, 1997 [JP] Japan ................................ 9-348548

[51] Int. Cl.$^7$ .................................................. H04B 3/36
[52] U.S. Cl. ............................ 455/8; 340/825.01; 455/63
[58] Field of Search .............................. 455/8, 445, 3.1, 455/63, 501, 226.1, 226.3; 379/93.31, 165, 166, 163, 164, 15, 16; 340/825.03, 825.01, 825.16; 370/216, 225, 227, 228

[56] References Cited

U.S. PATENT DOCUMENTS

| | | | |
|---|---|---|---|
| 3,882,456 | 5/1975 | Takada | 178/69 G |
| 4,188,615 | 2/1980 | Tan | 340/146.1 R |
| 4,387,456 | 6/1983 | Creteau | 370/13 |
| 4,451,916 | 5/1984 | Casper et al. | 714/4 |
| 5,010,550 | 4/1991 | Hirata | 340/825.01 |
| 5,187,808 | 2/1993 | Thompson | 455/518 |
| 5,311,170 | 5/1994 | Wachi et al. | 340/825.01 |
| 5,799,242 | 8/1998 | Sano | 455/63 |

FOREIGN PATENT DOCUMENTS 2-71637  3/1990  Japan .

*Primary Examiner*—Edward F. Urban
*Assistant Examiner*—Blane J. Jackson
*Attorney, Agent, or Firm*—Westman, Champlin & Kelly, P.A.

[57] ABSTRACT

There is provided a transmission line switch-over control system capable of significantly improving the nonoperational situation such as circuit disconnection during call or call quality deterioration without conducting unnecessary switch-over of a circuit or a transmission line.

A line quality input data handler 5 acquires at least one transmission line quality data out of a received level, a received C/N, and a bit error rate of a normal transmission line 3 and sends it to a forecaster 6. The forecaster 6 produces estimated data of situation of transmission line based on the input quality data of the transmission line. A switch-over controller 7 presumes possibility that the line quality will deteriorate within a predetermined time such as, for example, the mean call holding time. If the presumed possibility of deterioration is larger than a predetermined decision threshold, the switch-over controller effects control so as to switch over the normal transmission line 3 to a back-up transmission line 4. On the other hand, if the possibility of deterioration of the normal transmission line 3 becomes smaller than the above described decision threshold when the back-up transmission line 4 is in use, the switch-over controller effects control so as to switch back to the normal transmission line 3.

12 Claims, 3 Drawing Sheets

TRANSMISSION LINE SWITCH-OVER CONTROL SYSTEM

BACKGROUND OF THE INVENTION

1. Field of the Invention

The present invention relates to a transmission line switch-over control system, and in particular to a switch-over control system of a radio transmission line and a wire transmission line, or a switch-over control system of a circuit accommodated in a transmission line.

2. Description of the Related Art

In order to improve the rate of operation of a circuit accommodated in a transmission line, various switch-over schemes for switching over the circuit to its back-up transmission line when its normal transmission line has deteriorated in line quality or is disconnected have been proposed. Especially radio transmission lines have a feature that their line quality is degraded by a weather condition, such as rain or snow, although they are inexpensive and easy to install. Therefore, such a transmission line switch-over scheme as to back up the radio transmission line with a back-up transmission line is adopted.

Furthermore, in a wire transmission line such as a submarine cable as well, switch-over to a back-up transmission line is conducted when the loss for micro-bend has increased due to a twist caused by a tide on the sea bottom, or disconnection has occurred due to secular deterioration of a component in a repeater or a transmission terminal station.

FIG. 5 is a diagram for description of a conventional transmission line switch-over system, and it is a block diagram showing the configuration for switching over a telephone circuit accommodated in a radio transmission line to a back-up transmission line. The conventional transmission switch-over system includes a circuit switching system 11 for accommodating a plurality of telephone circuits 12 and conducting circuit switch-over, a radio equipment 13 for conducting modulation and demodulation of a circuit and emitting an electric wave with a radio frequency, a radio transmission line 14 serving as a normal transmission line, a back-up transmission line 15 which is a wire transmission line such as an optical cable, a line quality input data handler 16 for taking in supervisory data representing the line quality, such as a received level or BER of the radio transmission line 14, from the radio equipment 13, and a switch-over controller 17 for issuing a control signal such as a make busy signal to the circuit switching system 11 on the basis of the line quality data.

In the case where the quality of the normal transmission line is stable, speech from each telephone set is connected to the radio transmission line 14 via the circuit switching system 11 and the radio equipment 13. If the line quality is deteriorated due to a rainfall or the like and the fact that a predetermined threshold is exceeded (for example, the BER is $10^{-3}$ or less) is detected by the switch-over controller 17, however, then the switch-over controller 17 sends a switch-over signal like the Make-Busy signal (hereafter referred to as "MB signal") to the circuit switching system 11. Upon receiving the MB signal, the circuit switching system 11 conducts circuit block of the radio transmission line 14. In addition, the circuit switching system 11 conducts route alteration, and connects a new call from a telephone set to the wire transmission line 15 serving as the back-up transmission line.

In the conventional switch-over system, however, a circuit which is in conversation and connected to the circuit switching system 11 when the MB signal is received cannot be switched over to the back-up transmission line. This results in a problem that the conversation must be continued in the state of the poor line quality (with BER of $10^{-3}$ or less) until the conversation is completed. Furthermore, there is also a problem that the circuit is disconnected during the conversation in the worst case.

As one means for solving the problems, there is a method of beforehand setting a higher threshold value (for example, $10^{-4}$ or less in BER) than the poor line quality (for example, $10^{-3}$ in BER) for switching over from the normal transmission line 14 to the back-up transmission line 15.

In this method, however, circuit switch-over is conducted even in the case where the line quality is not deteriorated worse than the original threshold. Therefore, this method still has a problem that unnecessary circuit switch-over is conducted and consequently the facilities are subject to a heavier load. In addition, since in many cases a charge according to a measured rate system is made for the back-up transmission line 15, frequent use of the back-up transmission line 15 causes an unnecessary expense, resulting in poor economy.

Furthermore, in the case where an instantaneous switch-over in the lump is conducted from the whole of the normal transmission line 14 to the back-up transmission line 15 instead of the switch-over taking a circuit as the unit, the switch-over controller 17 effects the transmission line switch-over on the basis of the supervisory circuit quality data supplied from the radio equipment 13. In this case, however, there is a problem that all circuits in the conversation state are also disconnected at that time.

In the conventional transmission line switch-over system, it is impossible as heretofore described to assure the quality in conversation while avoiding unnecessary circuit and transmission switch-over and forced release of circuits. Therefore, it cannot be said that the conventional transmission line switch-over system is an effective transmission line switch-over system.

SUMMARY OF THE INVENTION

An object of the present invention is to provide a transmission line switch-over control system capable of significantly improving the nonoperational situation, such as the circuit disconnection during conversation or the speech quality deterioration, without conducting unnecessary switch-over of the circuit or transmission line.

To accomplish the above described objects, the present invention is firstly characterized in that, in a transmission line a transmission line switch-over control system having a normal transmission line and a back-up transmission line, said transmission line switch-over control system effecting control so as to switch over from said normal transmission line or a circuit accommodated in said normal transmission line to said back-up transmission line according to line quality of said normal transmission line, said transmission line switch-over control system comprising: forecaster means for producing estimated data of situation of transmission line based on line quality data of said normal transmission line; and switch-over control means for presuming possibility that the line quality will deteriorate within a predetermined time from a decision time point based upon estimated data produced by said forecaster means and for effecting the switch-over control based upon said presumed possibility.

The present invention is secondly characterized in that, said transmission line switch-over control system comprising: forecaster means for producing estimated data of situation of transmission line based on line quality data of said normal transmission line in such a state that switch-over to the back-up transmission line has been conducted; and switch-over control means for judging the possibility that the line quality will not deteriorate within a predetermined time and effecting switch-over control of the restoration based thereupon.

According to the first feature of the present invention, said transmission line switch-over control system switches over said normal transmission line or the circuit accommodated in said normal transmission line to said back-up transmission line or communicates necessity of said switch-over, prior to occurrence of quality deterioration or circuit disconnection. According to second feature of the present invention, said transmission line switch-over control system switches over the circuit previously switched back from the back-up transmission line to the normal transmission line again or communicates necessity of said switch-over when the normal transmission line has restored.

DESCRIPTION OF THE PREFERRED EMBODIMENTS

Figure 1:
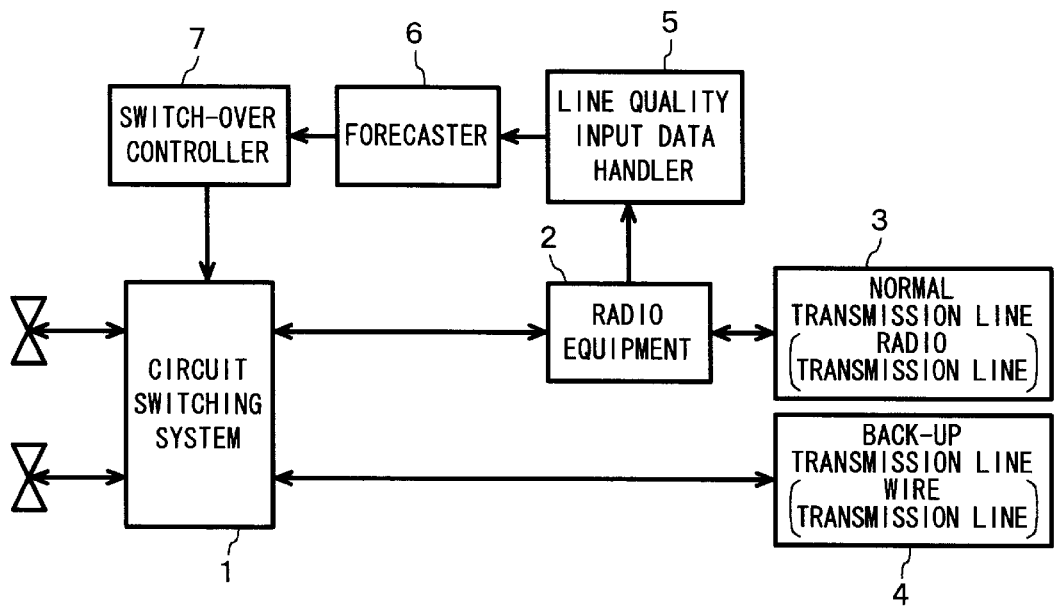
FIG. 1 is a block diagram showing the schematic configuration of a transmission line switch-over control system in an embodiment of the present invention.

Hereafter, the present invention will be described in detail by referring to the drawing. FIG. 1 is a block diagram showing the configuration of a transmission line switch-over control system which is a first embodiment of the present invention, and in which an estimated control signal is produced and a circuit is switched over mutually between the normal mode using the normal transmission line and the back-up mode using the back-up transmission line.

The present transmission switch-over control system includes a circuit switching system 1 for accommodating a plurality of telephone circuits and conducting circuit switch-over, a radio equipment 2 for conducting modulation and demodulation of a transmission circuit of the circuit switching system 1 and emitting an electric wave with a radio frequency, a radio transmission line 3 serving as a normal transmission line, a back-up transmission line 4 such as an optical cable, a line quality input data handler 5 supplied with quality data of the normal transmission line from the radio equipment 2, a forecaster 6 for estimating the quality deterioration situation on the basis of the line quality data according to a feature of the present invention, and a switch-over controller 7 for outputting a switch-over control signal of the normal mode and the back-up mode to the circuit switching system 1 on the basis of the estimated data produced by the forecaster 6.

Hereafter, description will be given centering around the line quality input data handler 5, the forecaster 6, and the switch-over controller 7 in order to clarify the difference from the conventional technique.

The line quality input data handler 5 takes in at least one of line quality data such as the received level and the received C/N observed in a receiver included in the radio equipment 2 and a bit error rate (BER) estimated in a demodulator. Furthermore, in a baseband system, an estimated value of the bit error rate can be taken out and input in some cases on the basis of the number of corrected bits at the time of error correction or a detected value of the parity or the check sum. The line quality input data handler 5 may select a suitable item out of these line quality data (or observed values) which can be input from the radio receiver or the demodulator. In the case where these sample values are analog signals, they are input after being subject to A/D conversion. These functions can be implemented easily by an ordinary data input device included in computers.

The line quality input data handler 5 collects the line quality data from the receiver or the demodulator of the radio transmission line at each predetermined sampling period, gets them in order as time series data, and inputs the time series data to the forecaster 6. The input sampling period of the line quality data is determined from the variation speed of the line quality and the time required to input the line quality data. For example, if the received level is used as the line quality data in the case where the quality of the radio transmission line varies due to the attenuation caused by rainfall, it can be said that a sampling period in the range of approximately 5 to 10 seconds is sufficient. This becomes a proper sampling period because the variation of the amount of the rainfall is not abrupt and the received level can be measured instantaneously by using a level meter. By the way, the sampling period should be determined to be such a time interval as to sufficiently follow the variation speed of the line quality.

The forecaster 6 produces estimated data of the line quality which is a principal function of the present invention. In the production of the estimated data, improvement of the precision can be expected by using more observed parameters. However, it is now assumed that estimation is conducted on the basis of time series data of the observed value of a single parameter for simplification of the processing. As for the observed parameter, a suitable one may be selected suitably according to the classification of the transmission line. In the present embodiment, a microwave radio transmission line is supposed and the observed value of the received level is supposed.

Production of the estimated data is implemented by statistical processing of the time series data of the observed value, i.e., statistical processing using a time series model. In the statistical processing using the time series model, an estimated series is produced on the basis of only past time series data of the subject observed parameter itself. For the purpose of the time series analysis, the curve fitting technique such as to minimize the least square error or the ARIMA model, for example, is effective.

The present embodiment is directed to a transmission line system with circuit switching capability. Thus, it is supposed that a call connected to a transmission line once by the circuit switching system 1 cannot be switched over to another transmission system during connection of a call. Therefore, there is adopted such a scheme that switch-over control is conducted so as to connect a call to the back-up transmission line beforehand instead of the normal radio transmission line in the case where it is expected, when the call has arrived at the circuit switching system, that the line quality will deteriorate lower than a required value during the connection of the call. As a result, it becomes possible to significantly reduce the possibility of such a situation that the permissible quality cannot be satisfied or occurrence of circuit disconnection caused by deterioration of the line quality during the connection of the call. In the case of telephone which is a representative of the circuit switching service, it is said that the call holding time, that is the time for a call, follows an exponential distribution. The mean call holding time is already known from the past actual results. For example, the mean call holding time (mean conversation time) can be considered to be approximately 3 minutes. In the present embodiment, it is found whether an estimated value of the line quality becomes lower than the required value within this mean call holding time by adopting a statistical time series estimation model using a past observed time series.

As for the time series model to be used for the above described object, it is necessary that on the basis of sample values over a past fixed interval (for example, past 10 minutes) given at each sampling time point, estimated values within the mean call holding time (for example, 3 minutes) from that point can be produced. Here, it is assumed that the ARIMA model can be applied, and an estimated time series is produced. As a matter of course, other time series models can also be used. However, such a model as to give the residual variance of estimated value is desirable, and thereby the confidence interval for the estimated series can be evaluated. Here, the ARIMA model is assumed as an example. Since the ARIMA model is well known, detailed description thereof will b e omitted.

In the case of the ARIMA model, an estimation formula is derived by evaluating the autocorrelation and partial autocorrelation from only sample values of the past time series data. It is thus possible to produce a highly reliable estimation model having no correlation in the residual series and having a small residual variance. In this technique, variance of estimated series can be calculated be sides the estimated value. For the estimated value, therefore, the confidence interval of, for example, 95% can be derived. In t he ARIMA model, an estimated model can be produced for a stationary process by using the so-called Box-Jenkins methodology. First of all, the autocorrelation and partial autocorrelation are evaluated for a past typical series, and a model term is selected. A model is determined so that the residual itself will have no correlation, follow normal distribution, and have minimum power. This procedure may be carried out off-line on the basis of a series exhibiting past typical behavior.

Figure 2:
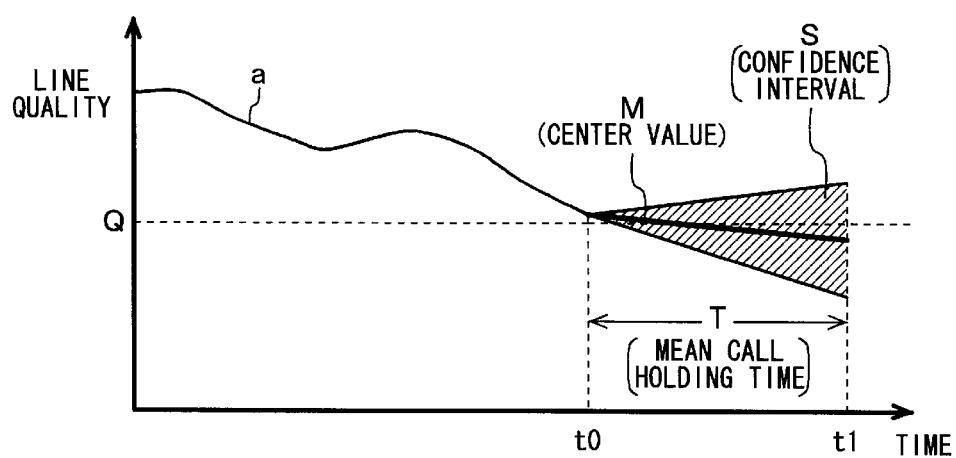
FIG. 2 is a diagram for description of switch-over decision using a predicted value in an embodiment of the present invention.

As for the estimated value, the estimation model is applied to an immediately preceding series at each decision time point, and an estimated series of a predetermined estimation interval (for example, corresponding to the mean call holding time) is produced. On the basis of the variance of the estimated value, the confidence interval is also evaluated. An example of production of the estimated value conducted by using the time series model as described above is shown in FIG. 2. In FIG. 2, a thin line a represents the line quality of the normal transmission line, and a thick line M after a time point t0 represents a center value of an estimated value P. A shaded range S represents a confidence interval of 95% for the estimated value P, and T represents mean call holding time.

In the forecaster 6, the estimated value P of the line quality and the confidence interval S are derived as heretofore described. Details of operation of the switch-over controller 7 in this case will hereafter be described.

In the case where both the estimated value P and the confidence interval are obtained for the line quality, the switch-over controller 7 can make a decision on the basis of a probability that the quality will deteriorate lower than a permissible value Q within a predetermined time (such as the mean call holding time) T from the decision time t0. Assuming now that the center value M of the estimation and a standard deviation SD are given, the estimated value P is compared with the permissible quality value Q at every time within the time T from the decision time t0. If the estimated value P and the confidence interval S at each time within the time T are given, a probability Prob that the estimated value P will become the permissible value Q or less (i.e., P<Q) can be calculated on the basis of probability distribution of the estimated data around the center value M. Especially in the case where the confidence interval can be derived according to the normal distribution, this probability can be evaluated easily by using an error function.

It is now assumed that the center value of the estimation is M(t) and the standard deviation of the confidence interval is SD(t) at arbitrary time t within the mean call holding time T from the decision time t0. If it can now be supposed that the estimation error of the estimated value producing model follows the normal distribution, the probability that the estimated value becomes the permissible quality value Q or less at time t can be calculated easily on the basis of the error function (Erfc). In other words, Prob (P<Q) can be derived by evaluating Erfc $\{[M(t)-Q]/SD(t)\}$. For example, if the Prob (P<Q) does not exceed a prescribed value at every time within the mean call holding time T from the decision time t0, the switch-over is not required. On the other hand, if there is time when the Prob (P<Q) exceeds the prescribed value or a predetermined time ratio is exceeded, then the possibility of the quality deterioration is considered to be high and the switch-over to the back-up transmission line is judged to be necessary. Furthermore, if the Prob (P<Q) becomes lower than a predetermined threshold value after the switch-over to the back-up transmission line, return to the normal transmission line can be judged to be possible.

The procedure described heretofore can be summarized as follows.

Procedure 1: Observed sample value time series data over a constant past interval (such as, for example, 10 minutes) from each time point are input from the line quality input data handler 5.

Procedure 2: In the forecaster 6, an estimated value P and a confidence interval S within a mean call holding time T (such as, for example, 3 minutes) from that time point are produced by using the ARIMA model or the like.

Procedure 3: In the switch-over controller 7, a permissible value Q of a predetermined permissible line quality is compared with the estimated value P and the confidence interval S input from the forecaster 6. The probability Prob (P<Q) that the line quality will deteriorate lower than the permissible value of the permissible line quality Q within a mean call holding time T is calculated.

If the data of the confidence interval S of the estimated value shown in FIG. 2 is used, this probability can be presumed by evaluating the ratio of the area of the shaded portion. If the deterioration probability Prob of the line quality is higher than a predetermined decision threshold, the switch-over controller 7 outputs the switch-over control signal to the circuit switching system 1 so as to connect a call incoming at and from that time point to the back-up transmission line.

The estimated data has a width between the upper limit value and the lower limit value after the elapse of the mean call holding time T (such as, for example, 3 minutes). Besides the evaluation of the probability using the confidence interval, various decision methods can be considered. For example, besides the example in which the decision is made depending upon whether the lower limit value of the estimated data exceeds the threshold, a value other than the lower limit value, such as the center value, may be used for the decision. The value to be compared with the threshold be determined by considering the importance of that circuit operation.

Figure 3:
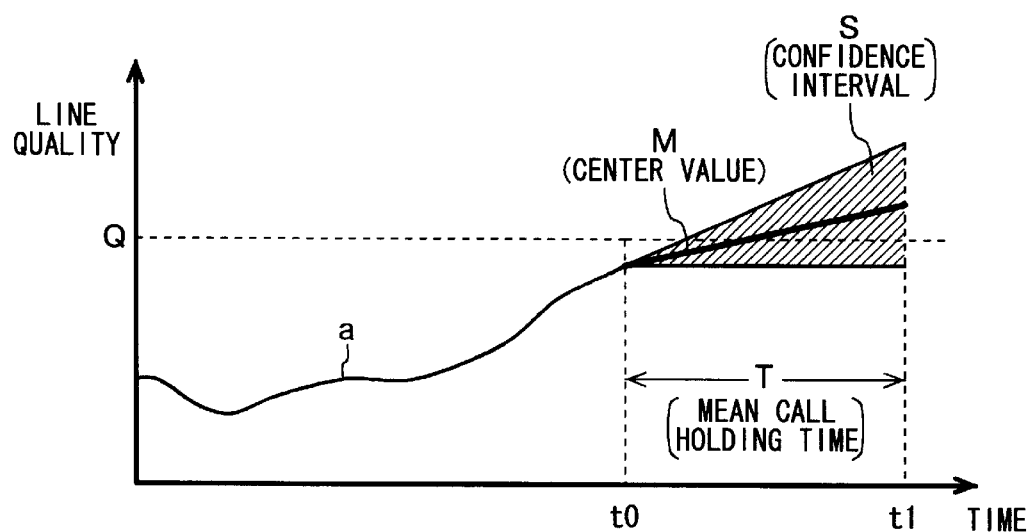
FIG. 3 is a diagram for description of switch-back decision using a predicted value in another embodiment of the present invention.

The procedures heretofore described are directed to the case where the normal transmission line 3 is being used at the decision time point t0. In the case where the connection to the back-up transmission line 4 is set at the decision time point t0 as shown in FIG. 3, however, the decision as to the restoration to the normal transmission line 3 and the connection control are conducted by changing the procedure 3 to the following procedure 3a.

Procedure 3a: In the switch-over controller 7, a permissible value Q of a predetermined permissible line quality is compared with the estimated value P and the confidence interval S input from the forecaster 6. The probability that the estimated data will deteriorate lower than the permissible value Q of the permissible line quality within a mean call holding time T is calculated. If the data of the confidence interval S of the estimated value shown in FIG. 3 is used, this probability can be presumed easily. If the deterioration probability of the line quality becomes lower than a predetermined decision threshold, the switch-over controller 7 outputs the switch-over control signal to the circuit switching system 1 so as to connect a new incoming call at and from that time point to the normal transmission line 3.

A second embodiment of the present invention will now be described. As a method for producing the estimated value from the past observed sample value time series data, the application of the time series model represented by the ARIMA model has been described above with reference to the first embodiment. In the case where the past sample series is significantly nonstationary, this technique is not suitable in some cases. In such a case, an estimated series using an estimation filter such as a well known Kalman filter is produced. The estimated value is produced by an adaptive estimation model.

In the case of the Kalman filter, filter parameters are specified according to an ordinary technique. In the case where the behavior of the observed series of the line quality data is stable, it is not necessary to change the filter characteristic. In the case where the change of the characteristic of the observed series is large, the specification of the filter parameters should be updated. The filter parameters may be updated periodically. Alternatively, a change of the observed series may be detected to update the filter parameters adaptively on the basis of the result.

As for the estimated value P, an estimated series over a predetermined estimation interval T (for example, corresponding to the mean call holding time) is produced as the filter output at each decision time point. Procedures after the estimated series has been produced are the same as those of the first embodiment, and consequently description thereof will be omitted.

Figure 4:
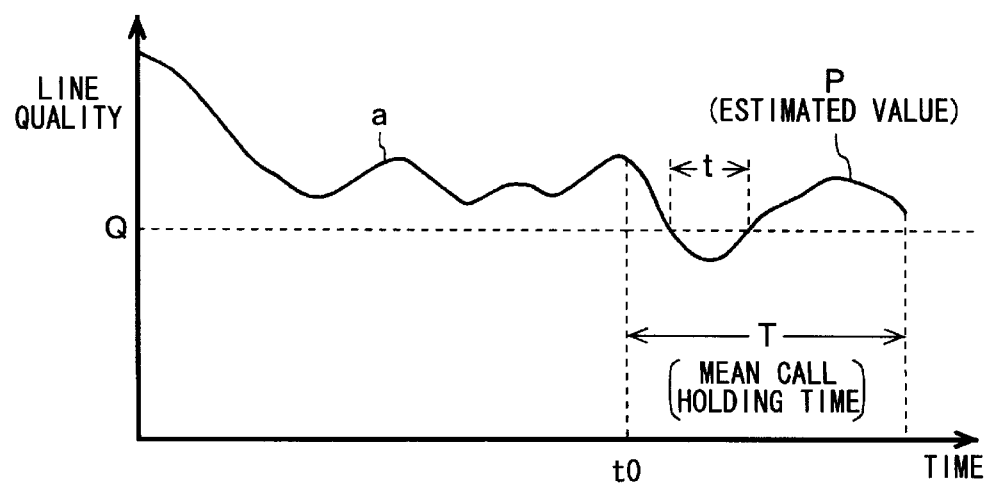
FIG. 4 is a diagram for description of switch-over decision using a predicted value in still another embodiment of the present invention.
Figure 5:
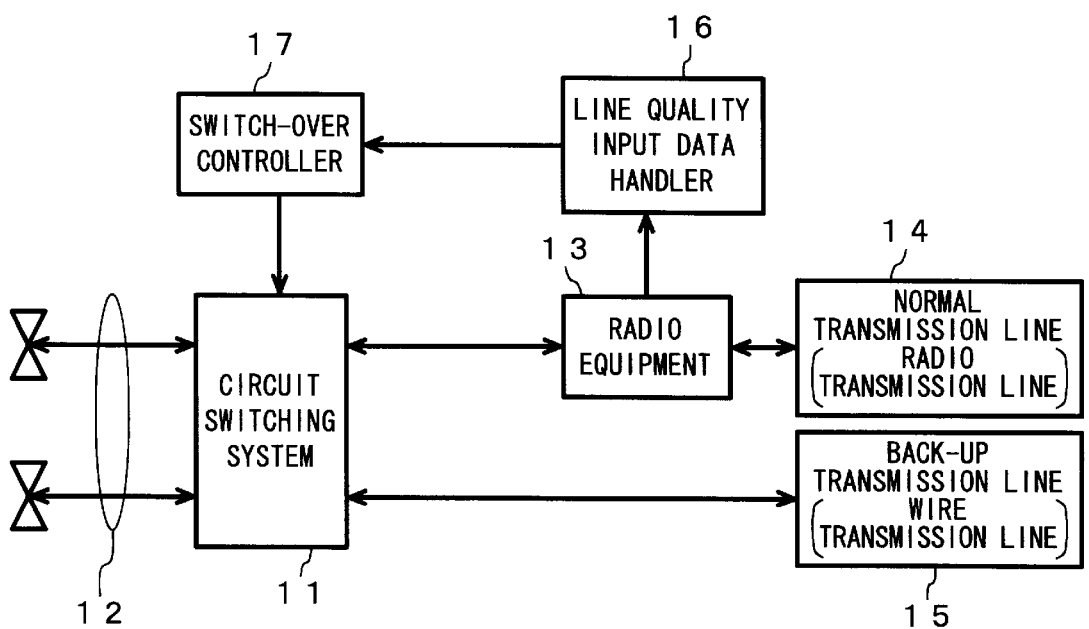
FIG. 5 is a block diagram showing the schematic configuration of a conventional transmission line switch-over control system.

In the first and second embodiments, the confidence interval is calculated on the basis of the variance of the estimated value P, and decision as to the switch-over control is made on the basis of the confidence interval thus calculated. Besides this method, decision as to the switch-over control can be attempted on the basis of only the estimated value P as shown in FIG. 4. In this case, the production in the switch-over controller 7 is changed as described below.

In the case where only the estimated value (center value) P of the line quality is obtained and the confidence interval S is not obtained, a decision is made by comparing the variation of the estimated value P within the mean call holding time T from the decision time t0 with the permissible quality value Q. It is now assumed that the sum total of time during which the estimated value P becomes less than Q within the mean call holding time T from the decision time t0 is t. If the time ratio (t/T) is larger than a predetermined decision threshold, then the possibility of the quality deterioration is considered to be high, and the switch-over to the back-up transmission line is judged to be proper. If the time ratio (t/T) becomes lower than a predetermined threshold after the switch-over to the back-up transmission line, switch back to the normal transmission line is judged to be possible.

In other words, the decision and production of the switch-over control signal using the procedure 3 are altered to the following procedure 3b.

Procedure 3b: In the switch-over controller 7, a permissible value Q of a predetermined permissible line quality is compared with the estimated value P input from the forecaster 6. A time ratio (t/T) with which the line quality will deteriorate lower than the permissible value Q of the permissible line quality within a mean call holding time T is calculated. If the deterioration time ratio (t/T) of the line quality is higher than a predetermined decision threshold, the switch-over controller 7 outputs the switch-over control signal to the circuit switching system 1 so as to connect a new incoming call at and from that time point to the back-up transmission line 4.

If the switch-over of the transmission line is judged to be necessary on the basis of the result of the decision heretofore described, the switch-over controller 7 produces and outputs the switch-over control signal. If the time ratio with which the quality of the normal transmission line will deteriorate lower than the permissible value is judged to be higher than the decision threshold, the switch-over controller 7 switch overs the circuit to the back-up transmission line. To be concrete, the switch-over controller 7 should send a circuit blocking control signal to the circuit switching system 1 in order to block the connection of a new incoming call to the circuit of the normal transmission line 3. As a result, incoming calls thereafter are connected to the circuit of the back-up transmission line 4. It should be noted that a call connected to the normal transmission line 3 is continued in communication as it is via the normal transmission line 3.

On the other hand, it is now assumed that the back-up transmission line 4 is in use because of the quality deterioration of the normal transmission line 3. If the normal transmission line 3 is judged to have been restored above the permissible quality in this state, the use of the normal transmission line is resumed. On the basis of this decision, the switch-over controller 7 sends the switch-back signal to the circuit switching system 1. In other words, the circuit blocking control signal set in the circuit switching system 1 for the circuit of the normal transmission line 3 is canceled. As a result, incoming calls thereafter are connected to the circuit of the normal transmission line 3.

A third embodiment of the present invention will now be described. In a trouble from a kink (i.e., an increase of the transmission loss due to a kink) of an optical fiber or a trouble due to secular deterioration of a component used in transmission facilities, there is such a trouble that the line quality gradually falls with a certain fixed pattern. In the radio transmission line as well, the case where the deterioration patterns are obvious is also imagined in, for example, deterioration of the line equality due to a long-term or middle-term fading. Therefore, it is also possible to store logs of these troubles in the forecaster 6, and compare the estimated value with past trouble logs. If they coincide with each other up to some point, the corresponding past trouble log can be used.

In the case where past trouble logs are given, the correlation between the time series data of past observed samples themselves, or an estimated series produced therefrom by using the above described time series model or Kalman filter and the past trouble logs may be statistically evaluated. It is now assumed that a plurality of typical past trouble logs which caused deterioration worse than the permissible quality are prepared, and the crosscorrelation between the time series data of each of them and the above described observed or estimated time series data is evaluated. It is not necessary to make always the length of log constant. On the other hand, as for the observed value, a sample series before the decision time is collected, and the correlation between it and every past trouble log is evaluated. By using an observed series having the same length as each log, a correlation coefficient between it and each log is evaluated. If the correlation coefficient is larger than a predetermined threshold, then the similarity with the trouble log is judged to be high and the line quality deterioration of the normal transmission line is judged to occur. In this case, the switch-over to the back-up transmission line is effected. The evaluation of the crosscorrelation may be conducted for a predetermined interval at each time point. If the crosscorrelation coefficient with respect to such a log that the quality deteriorates below the permissible line quality within the mean call holding time from that time point is larger than a predetermined threshold, then the decision of switch-over to the back-up transmission line should be made. To be concrete, the procedures 2 and 3 in the first embodiment should be changed to the following procedures 2c and 3c.

Procedure 2c: In the forecaster 6, the crosscorrelation between past observed sample time series data at that time point and such a log that the quality deteriorated below the permissible line quality within the mean call holding time from that time point is evaluated. Here, it is assumed that the trouble log is given as time series data corresponding to the past observed sample time series data at that time point, and a plurality of typical logs are prepared.

Procedure 3c: In the switch-over controller 7, the cross correlation coefficient with respect to a trouble log input from the forecaster 6 is compared with a predetermined threshold and evaluated. If there is at least one trouble log having a crosscorrelation value larger than the threshold, the switch-over controller 7 outputs the switch-over control signal to the circuit switching system 1 so as to connect a call incoming at that time point to the back-up transmission line. On the other hand, in the case where the back-up transmission line is used at the decision time point, switch back to the normal transmission line is effected if there is not such a trouble log that the crosscorrelation coefficient is larger than the threshold.

In each of the above described embodiments, the switch-over controller 7 outputs a control signal for switching over the circuit switching system 1. However, the present invention is not limited to this. Alternatively, the switch-over controller 7 may display a preliminary alarm signal for switching from the normal transmission line to the back-up transmission line or switching back from the back-up transmission line to the normal transmission line and thereby urge operators to manually switch over the transmission line.

According to the present invention, the forecast switch-over control is conducted as evident from the foregoing description. Therefore, not only unnecessary circuit switch-over can be avoided, but also the possibility that a call after connection is subject to quality deterioration during conversation or subject to forced call termination in the worst case can be significantly reduced. In the case of circuit connection service, it is difficult for an ordinary circuit switching system to switch over an on-going call to the back-up transmission line. If the present invention is used in a transmission line with circuit connection service, the effect of the improvement is very significant.

Furthermore, in the case where the circuit has been switched over to the back-up transmission line, the present invention makes it possible to switch back the circuit to the original transmission line rapidly and exactly when the normal transmission line has recovered. In the case where a charge according to a measured rate system is made for the back-up transmission line, therefore, payment of unnecessary expenses can be avoided and the economical effect is also significant.

Furthermore, according to the present invention, estimated data are produced by using the data of the line quality for conducting the switch-over control of the transmission line. As a result, communication under a favorable line quality becomes possible.

What is claimed is:

1. A transmission line switch-over control system having a normal transmission line and a back-up transmission line, said transmission line switch-over control system effecting control so as to switch over from said normal transmission line or a circuit accommodated in said normal transmission line to said back-up transmission line according to line quality of said normal transmission line, said transmission line switch-over control system comprising:

forecaster means for producing estimated data of line quality of transmission line of said normal transmission line; and switch-over control means for presuming possibility that the line quality will deteriorate within a predetermined time from a decision time point based upon estimated data produced by said forecaster means and for effecting the switch-over control based upon said presumed possibility, wherein said transmission line switch-over control system switches over said normal transmission line or the circuit accommodated in said normal transmission line to said back-up transmission line or communicates necessity of said switch-over, prior to occurrence of quality deterioration or circuit disconnection by using a switch-over control signal from said switch-over control means.

2. A transmission line switch-over control system according to claim 1 wherein said switch-over control means evaluates probability that estimated data of the normal transmission line quality deteriorates below a predetermined permissible value within a predetermined time, and decides to switch back said normal transmission line to the back-up transmission line when said possibility is larger than a decision threshold.

3. A transmission line switch-over control system according to claim 1, wherein said estimated data comprises an estimated value and a confidence interval of the line quality.

4. A transmission line switch-over control system according to claim 1, wherein said estimated data is an estimated value of the line quality.

5. A transmission line switch-over control system according to claim 1, wherein said estimated data is produced by using at least one transmission line quality data out of a received level, a received C/N, and a bit error rate of the normal transmission line.

6. A transmission line switch-over control system according to claim 5, wherein said transmission line quality data is acquired at time intervals depending upon a quality requirement of the circuit accommodated in said normal transmission line.

7. A transmission line switch-over control system having a normal transmission line and a back-up transmission line, said transmission line switch-over control system effecting control so as to switch over from said normal transmission line or a circuit accommodated in said normal transmission line to said back-up transmission line according to line quality of said normal transmission line, said transmission line switch-over control system comprising:

forecaster means for producing estimated data of line quality of transmission line of said normal transmission line in such a state that switch-over to the back-up transmission line has been conducted; and switch-over control means for judging the possibility that the line quality will deteriorate within a predetermined time to have disappeared and effecting switch-over control based thereupon, wherein said transmission line switch-over control system switches back the circuit previously switched over to the back-up transmission line to the normal transmission line again or urges operators to switch over by using a switch-over control signal from said switch-over control means.

8. A transmission line switch-over control system according to claim 7, wherein in such a state that switch-over to the back-up transmission line has been conducted, said switch-over control means evaluates probability that estimated data of the normal transmission line quality deteriorates below a predetermined permissible value within a predetermined time, and decides to switch back to the normal transmission line again when said deterioration possibility has become smaller than a decision threshold.

9. A transmission line switch-over control system according to claim 7, wherein said estimated data comprises an estimated value and a confidence interval of the line quality.

10. A transmission line switch-over control system according to claim 7, wherein said estimated data is an estimated value of the line quality.

11. A transmission line switch-over control system according to claim 7, wherein said estimated data is produced by using at least one transmission line quality data out of a received level, a received C/N, and a bit error rate of the normal transmission line.

12. A transmission line switch-over control system according to claim 11, wherein said transmission line quality data is acquired at time intervals depending upon a quality requirement of the circuit accommodated in said normal transmission line.

* * * * *

UNITED STATES PATENT AND TRADEMARK OFFICE
CERTIFICATE OF CORRECTION

PATENT NO. : 6,141,532
DATED : October 31, 2000
INVENTOR(S) : Takeshi Mizuike et al.

It is certified that error appears in the above-identified patent and that said Letters Patent is hereby corrected as shown below:

<u>Title page,</u>
Item [56], References Cited, FOREIGN PATENT DOCUMENTS, please add the following references:

```
-- 3-17839    8/1991     Japan
   4-213238   8/1992     Japan
   8-335893   12/1996    Japan
   9-008706   1/1997     Japan --
```

Signed and Sealed this

Twenty-ninth Day of October, 2002

Attest:

Attesting Officer

JAMES E. ROGAN
*Director of the United States Patent and Trademark Office*